June 20, 1950  G. D. HANCHETT, JR  2,511,981
ELECTRONIC THERMOSTAT
Filed Sept. 26, 1947

Inventor
*George D. Hanchett, Jr.*
By Condas C. Henry
Attorney

Patented June 20, 1950

2,511,981

UNITED STATES PATENT OFFICE 2,511,981

ELECTRONIC THERMOSTAT

George D. Hanchett, Jr., Millburn, N. J., assignor to Radio Corporation of America, a corporation of Delaware Application September 26, 1947, Serial No. 776,254

1 Claim. (Cl. 321—39)

This invention relates to an improved circuit arrangement for controlling the current supplied to an electric heater device and more particularly to a control circuit employing electronic means for regulating the transfer of energy between the supply circuit and the heater device.

Many circuits have heretofore been proposed for controlling the amount of current flowing to a heating element. Some of the proposed methods employ thermostatic controlling means involving off-and-on switching, which necessitates the use of mechanically moving parts. Others of such methods eliminated the necessity of using moving parts by employing some form of electronic control. An illustration of this latter type of device is shown in the publication, "Electron Tubes In Industry," by Keith Henney, on page 261, Fig. 88. This device utilizes a bridge circuit and a gas tube in combination for controlling the current supplies to a heating element. While these prior art devices are operable, they lack the smoothness of operation necessary for certain types of work, are costly to construct, and are physically bulky.

An object of my invention is to provide a new and improved electric circuit of the general type disclosed in the aforesaid Henney publication, which includes an electronic valve means for controlling the energy supplied to a load in accordance with a predetermined controlling influence.

Another object of my invention is to provide electrical controlling means for a current operated heater that is stable in operation, inexpensive to construct and light in weight.

Still another object of my invention is to provide electronic regulating means particularly adaptable to the fine degree of control necessary for heating blankets and the like.

A further object of my invention is to provide a heat regulator energized by alternating current which is smooth in operation and which may continuously regulate the temperature of the heater within narrow limits.

A feature of the invention resides in the employment of means whereby a heat responsive bridge is utilized and the unbalance of the bridge produced by temperature changes controls the direct current potential applied to the grid of a gas discharge tube to vary its current flow. The varying current thus passed by the tube is used to regulate the current through the heating element, and thus the temperature of the heated device.

A particular feature of the invention is the provision of means for preventing the discharge of the gaseous discharge tube before the proper heating time has elapsed. In the chosen embodiment of the invention, I accomplish this result by utilizing a separate discharge tube for preventing current flow through the gaseous discharge tube until the lapse of such time.

The novel features which I believe are characteristic of my invention are set forth with particularity in the appended claim. The invention itself, however, as to both its organization and method of operation will best be understood by reference to the description which follows hereunder taken in conjunction with the drawings forming a part of my disclosure and in which:

Figure 1:
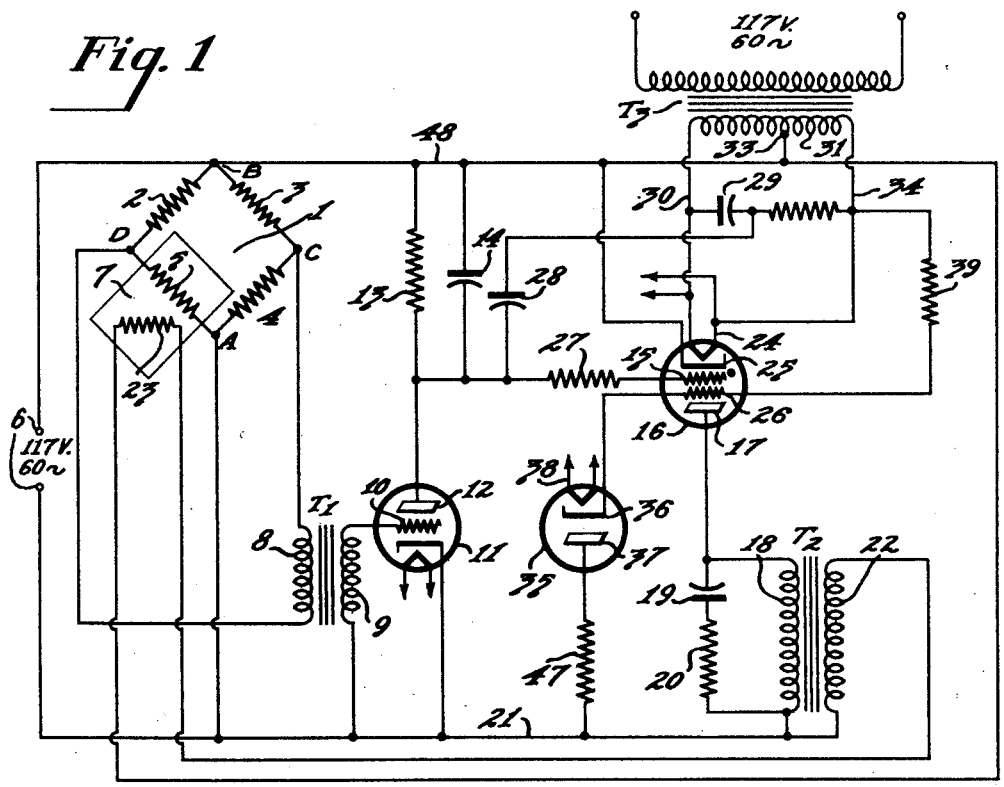
Fig. 1 is a schematic representation of a preferred embodiment of the invention.

Referring to Fig. 1 of the drawings, there is utilized a Wheatstone bridge 1, comprising four resistances, 2, 3, 4, and 5, respectively, one or more of which may be of the variable coefficient type. This bridge or any of its component parts is placed within the chamber, blanket or other device 7, to be heated. The bridge is energized at points A and B from a suitable supply source, 6.

There are provided a transformer T1, having a primary 8, and a secondary 9; and an amplifier tube 11, having an anode 12, a control grid 10, and a cathode. The primary 8, of the transformer is connected across the bridge at suitable points such as C and D, while its secondary 9, is connected to the grid of the tube 11, and to the common supply line 21, of the supply source 6. Supply potential for the amplifier is applied to its anode from source 6, through a plate resistor 13, the cathode of said amplifier being connected to the common supply line, 21. A condenser 14, is placed in parallel with the resistor 13.

The primary portion of the control circuit includes a gaseous discharge tube 16, and a saturable reactor T2, the gaseous discharge tube comprising a heater filament 24, a cathode 25, a control grid 15, an auxiliary grid 26, and an anode 17, and the saturable reactor comprising primary and secondary coils 18 and 22, respectively.

The anode of the amplifier tube 11, is connected to the control grid of the gaseous discharge tube through a suitable resistor 27, and the cathode 25, of such tube is energized from the supply source 6, through a line 48. Voltage is supplied to the filament 24, of the gaseous discharge tube by the secondary 31, of the transformer T3, through lines 30 and 34. Plate potential for the gaseous tube is derived from the source 6, through the line 21, and the primary winding 18, of the saturable reactor.

Serially connected to the grid 15, of the gaseous discharge tube are the resistor 27, and the capacitors 28 and 29, which are also connected to the line 30, and to the secondary winding 31, of the transformer T3. The secondary winding of the saturable reactor is energized in series with the heater element 23, by the supply source 6, through the lines 21 and 48. Connected across the primary winding 18, of the saturable reactor is a filter network comprising a capacitor 19, in series with a resistor 20.

Delayed conduction of the gaseous discharge tube is accomplished by a rectifier tube 35, having an anode 37, a cathode 36, and a filament 38. The cathode of the rectifier is connected to both the auxiliary grid 26, of the gaseous discharge tube and the resistor 39, and is also connected through the line 34, to the winding 31, of the transformer T3. The anode 37, of the rectifier tube is energized by the supply source 6, through the supply line 21, and the plate resistor 47.

Figure 2:
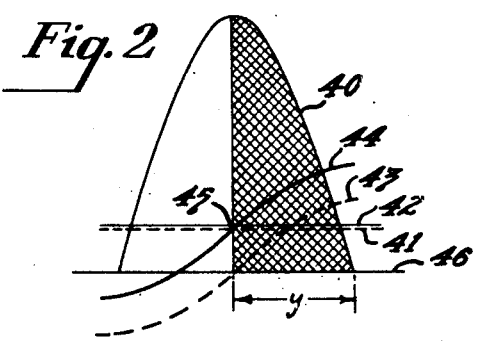
Fig. 2 is a graphic representation of the action of the gaseous discharge tube with a particular fixed bias.
Figure 3:
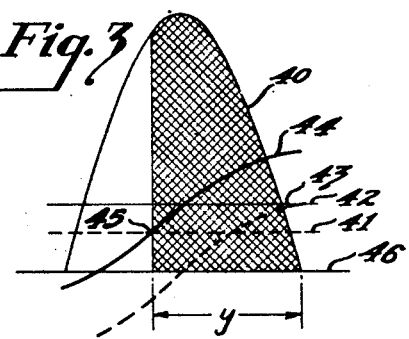
Fig. 3 is also a graphic representation of the action of the gaseous discharge tube and is similar to Fig. 2 except that the fixed bias has been increased; and, Fig. 4 is similar to Fig. 2 with the exception that the fixed bias has been decreased.
Figure 4:
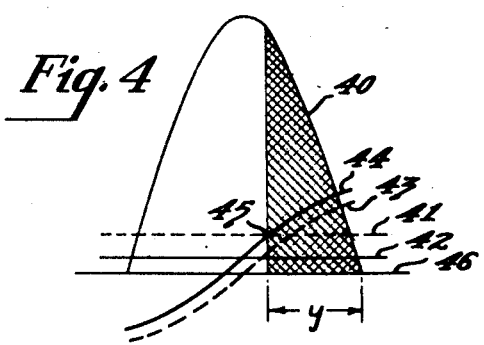

The operation of my invention may best be understood by referring to Figs. 2, 3, and 4, of the drawing, in which the curves shown are plotted with volts as the ordinate against time as the abscissa. In Fig. 2, the curve 40, represents the wave form of the alternating potential applied to the plate of the gaseous discharge tube. The dotted line 41, represents the potential on the grid at which the tube will start conducting, while the line 42, represents the direct potential applied to the grid. The wave form of the alternating potential applied to the grid is represented by the curve 43, and curve 44, is the resultant of lines 42 and 43, and represents the actual voltage applied to the grid of the gaseous discharge tube. The point at which the tube fires is designated by the numeral 45, and the reference line for the voltage shown is designated by the numeral 46.

By reference to Fig. 2, it will be seen that there will be no conduction, while the plate potential is a positive value, until the grid voltage reaches the value necessary to initiate conduction. Once this current flow has commenced, however, it will continue until the voltage applied to the plate has decreased to a value below the ionization potential of the gas in the tube. Thus the conduction time is represented by the distance Y.

In Fig. 3, the value of direct current, potential on the grid as represented by line 42, has been increased, thereby increasing the value of the resultant grid voltage curve 44. This increased resultant grid voltage causes the firing point 45, to shift further to the left resulting in a longer conduction time, Y.

In Fig. 4, the value of direct current potential has been decreased, causing the firing point 45, to move to the right, resulting in a shorter conduction time.

It will be noted from the above that the greater the value of direct current potential applied to the grid, the greater will be the flow of current through the tube.

With the foregoing in mind and referring to Fig. 1, it will be assumed that the temperature of the chamber, blanket, or other device to be heated is lower than the predetermined value, and the resistors 3 and 5, are such that their resistance will increase appreciably with an increase in temperature. The unbalance produced thereby will cause a flow of current from D to C through the primary winding 8, of the transformer T1. By transformer action there will be produced a negative potential on the grid 10, of the amplifier tube 11, which causes less plate current to flow, resulting in a higher positive direct current voltage developed across the condenser 14, which voltage is fed to the grid 15, of the thyratron tube 16. As has been described, increase of the positive direct current voltage on the grid 15, causes more plate current to flow through the primary 18, of the saturable reactor T2. Due to the direct current through this winding the transformer will become saturated, decreasing the impedance of the secondary winding 22, thereby increasing the flow of current through the series heating element 23. This increased current flow through the heating element will accordingly raise the temperature in the heated chamber 7.

Should the temperature of the chamber increase above the desired value, the process will be reversed causing a decreased flow of heater current, thereby lowering the chamber temperature.

It can be seen that if the direct current voltage, applied to the grid 15, of the gaseous discharge tube 16, varies in value, more or less conduction will take place in the tube. In combination with the direct current voltage from the condenser 14, there is applied to the grid of the gaseous discharge tube an alternating voltage obtained from the winding 31, of the transformer T3, through the phase shifting capacitors 28 and 29, which alternating voltage is 90° out of phase with the potential applied to the anode of the tube 16. When large amounts of current are called for, as in the above illustration, the angle of conduction will be large and when little current is called for, the angle of conduction will be small. It is by this action of superimposing the alternating potential on the varying direct current potential that the disclosed invention affords a greater sensitivity to temperature changes and a smoothness of operation which is lacking in circuits heretofore proposed.

In describing the delaying action of the screen grid 26, of the gaseous discharge tube 16, it will be assumed that the supply power 6, and the heater filament voltage of the transformer T3, have just been turned on. Considering the instantaneous values of the alternating voltage supply, the input circuit is so arranged that when the feed line 34, from the winding 31, is negative, the line 21, from the supply source 6, is positive for that same instant. By means of a center-tap 33, the secondary winding 31, of the transformer T3, there is applied to the shield grid of the gaseous discharge tube an alternating bias potential which is equal to one-half of its filament voltage and which is 180° out of phase with its anode voltage. Tracing the circuit from the negative line 34, a negative voltage is reflected through the resistor 39, to the shield grid 26, and to the cathode 36, of the rectifier 35. At this moment positive voltage of the line 21, is conducted through the resistor 47, to the anode 37, of the rectifier and to the plate 17, of the gaseous discharge tube, through the winding 18, of the reactor T2. At this same instant, the line 30, from the winding 31, will be necessarily at a positive alternating voltage, which positive voltage is transmitted as such to the control grid 15, of the gaseous discharge tube, through the phase shifting capacitors 28 and 29, and resistor 27. At this instant there exists a positive potential on the control grid as well as on the anode, and a highly negative potential on the shield grid of the gaseous discharge tube. Conduction of the gaseous discharge tube is prevented by this negative shield grid potential. The instantaneous potentials on the elements of the rectifier 35, are plus on the anode 37, and negative on the cathode 36. The heater filament of the rectifier is connected to the same power supply as is the heater filament of the gaseous discharge tube.

The rectifier tube is so chosen that it will not conduct until its heater filament 38, has attained the proper operating temperature and so that the time to reach such temperature is the same as that required by the heater of the gaseous discharge tube. Until this desirable heater temperature is reached, the rectifier tube will remain cut-off and the negative potential of the shield-grid 26, will hold the gaseous tube nonconductive, although the instantaneous potentials at the cathodes and anodes are proper for conduction. After sufficient heating time has elapsed, and the instantaneous alternating voltages are proper, the rectifier tube will then conduct. Current flow through the rectifier 35, and the resistor 38, will be of such a nature as to produce a positive potential on the shield-grid 26, thereby balancing out the previously existing negative potential. The gaseous discharge tube is now in condition to conduct without injury to the tube, and conduction will take place.

Although the invention has been described with particularity, it is to be understood that the particular details and arrangements shown are by way of illustration only and not by way of limitation. Various modifications will suggest themselves to those skilled in the art and are to be considered as falling within the spirit of the invention.

The invention having been thus described, what I claim is:

A control circuit for gas discharge devices comprising, in combination, a source of alternating current supply voltage having a pair of terminals, a gas discharge tube having an anode, a cathode and a control electrode, said cathode being connected to one of said terminals, a load device connected between said anode and the other of said terminals, an amplifying device having a control electrode and 1st and 2nd auxiliary electrodes, the 1st auxiliary electrode of said amplifying device being connected to said other terminal, a resistor connected between the 2nd auxiliary electrode of said amplifying device and said one of said terminals, a second resistor connected between the 2nd auxiliary electrode of said amplifying device and the control electrode of said gas discharge device, a storage device connected in parallel with said first mentioned resistor, means applying a portion of said alternating current supply voltage between the 1st auxiliary electrode and the control electrode of said amplifying device, and means varying the proportion of said supply voltage supplied to the said control electrode of said amplifying device in accordance with the direct current flowing through said load device.

GEORGE D. HANCHETT, Jr.

REFERENCES CITED

The following references are of record in the file of this patent:

UNITED STATES PATENTS

| Number | Name | Date |
| --- | --- | --- |
| 1,654,937 | Knight | Jan. 3, 1928 |
| 1,654,988 | Mittag | Jan. 3, 1928 |
| 1,694,264 | Hull | Dec. 4, 1928 |
| 1,904,485 | Livingston | Apr. 18, 1933 |
| 1,973,123 | Stogoff | Sept. 11, 1934 |
| 2,026,800 | Rechnitzer | Jan. 7, 1936 |
| 2,030,100 | Dawson | Feb. 11, 1936 |
| 2,126,398 | Knowles | Aug. 9, 1938 |
| 2,150,265 | Conover | Mar. 14, 1939 |
| 2,248,821 | Haselton et al. | July 8, 1941 |
| 2,266,569 | Schneider et al. | Dec. 16, 1941 |
| 2,435,961 | Gibbons et al. | Feb. 17, 1948 |
| 2,443,658 | Kratz | June 22, 1948 |